(12) United States Patent
Wilson

(10) Patent No.: US 7,927,040 B2
(45) Date of Patent: Apr. 19, 2011

(54) METHOD FOR STORING, DELIVERING AND SPOOLING PREASSEMBLED PIPELINES

(76) Inventor: Michael W. N. Wilson, Aberdeen (GB)

( * ) Notice: Subject to any disclaimer, the term of this patent is extended or adjusted under 35 U.S.C. 154(b) by 115 days.

(21) Appl. No.: 12/228,104

(22) Filed: Aug. 8, 2008

(65) Prior Publication Data

US 2010/0034591 A1    Feb. 11, 2010

(51) Int. Cl.
*F16L 1/12* (2006.01)
(52) U.S. Cl. ............... 405/168.1; 405/168.3; 405/168.4; 405/158; 405/170
(58) Field of Classification Search ............... 405/154.1, 405/158, 166, 168.1, 168.2, 168.3, 168.4, 405/169, 170, 173, 174, 184.1
See application file for complete search history.

(56) References Cited

U.S. PATENT DOCUMENTS

| | | | | |
|---|---|---|---|---|
| 3,247,674 A | * | 4/1966 | Macardier | 405/167 |
| 3,712,100 A | | 1/1973 | Key et al. | |
| 3,860,122 A | | 1/1975 | Cernosek | |
| 3,965,713 A | | 6/1976 | Horton | |
| 4,117,692 A | * | 10/1978 | Oberg | 405/168.3 |
| 4,260,288 A | * | 4/1981 | Ellers et al. | 405/168.3 |
| 4,274,799 A | | 6/1981 | Tisdale, III et al. | |
| 4,452,550 A | * | 6/1984 | Hofmeester | 405/158 |
| 4,798,500 A | * | 1/1989 | Morton | 405/166 |
| 5,533,834 A | | 7/1996 | Recalde | |
| 6,089,489 A | | 7/2000 | Cruickshank | |
| 6,120,212 A | * | 9/2000 | Martin | 405/168.3 |
| 6,540,440 B1 | * | 4/2003 | Beaujean | 405/168.1 |
| 6,554,538 B2 | | 4/2003 | Stockstill | |
| 7,544,013 B2 | * | 6/2009 | Hoffmann et al. | 405/168.1 |

FOREIGN PATENT DOCUMENTS

| | | |
|---|---|---|
| CA | 2287711 | 12/2000 |
| CA | 2252785 | 10/2006 |
| WO | WO 2008/078983 | 7/2008 |

OTHER PUBLICATIONS

International Search Report and Written Opinion issued by the International Searching Authority (ISA/US) on Sep. 21, 2009 in corresponding PCT/US09/53014 (15 pages).
Global Industries, "Deepwater Challenges Deepwater Solutions from Surface to 10,000 Feet", from www.globalind.com, Sulphur, Louisana, USA.
World Pipelines, vol. 7, No. 11, Nov. 2007; www.worldpipelines.com.
Coil, "The Circular Loading System".

\* cited by examiner

*Primary Examiner* — Frederick L Lagman
(74) *Attorney, Agent, or Firm* — Gable & Gotwals

(57) ABSTRACT

A method and system for storing, delivering and spooling pipelines, such as underwater pipelines used in off-shore well production systems, enables continuous pipeline reeling operations for multi-mile pipelines without the need for welding stops, a spool base of corresponding multi-mile length, a straight line path from storage to ship and/or stern mooring of the reel carrying vessel. Bending radii for the pipeline from welding to reeling are held to a determined minimum within the range of plastic deformation radii of the pipeline and preferably within the range of elastic bending radii of the pipeline.

52 Claims, 14 Drawing Sheets

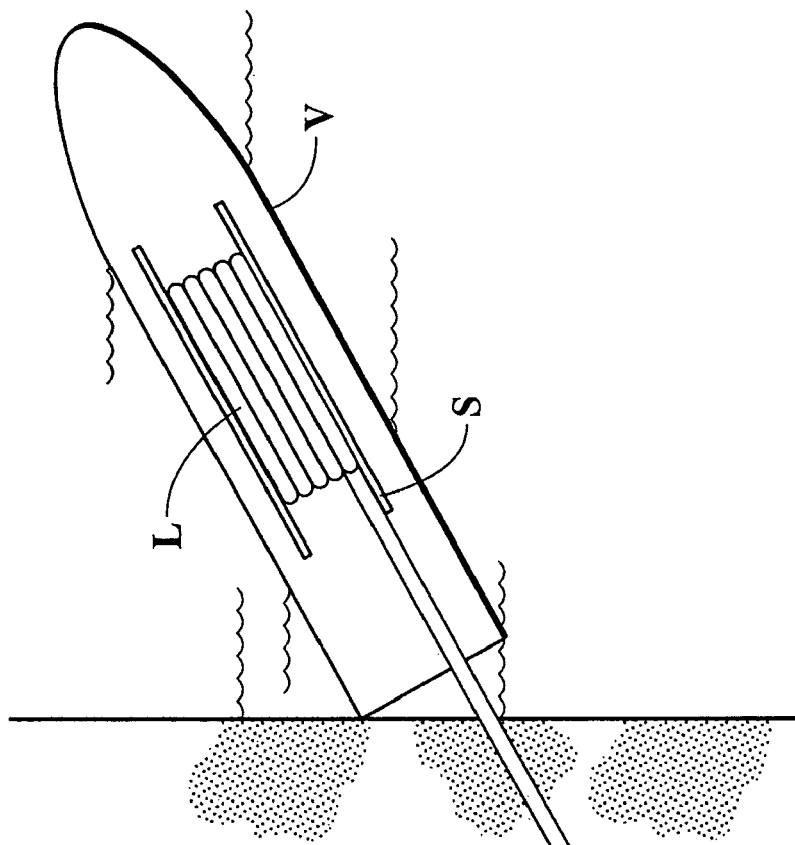
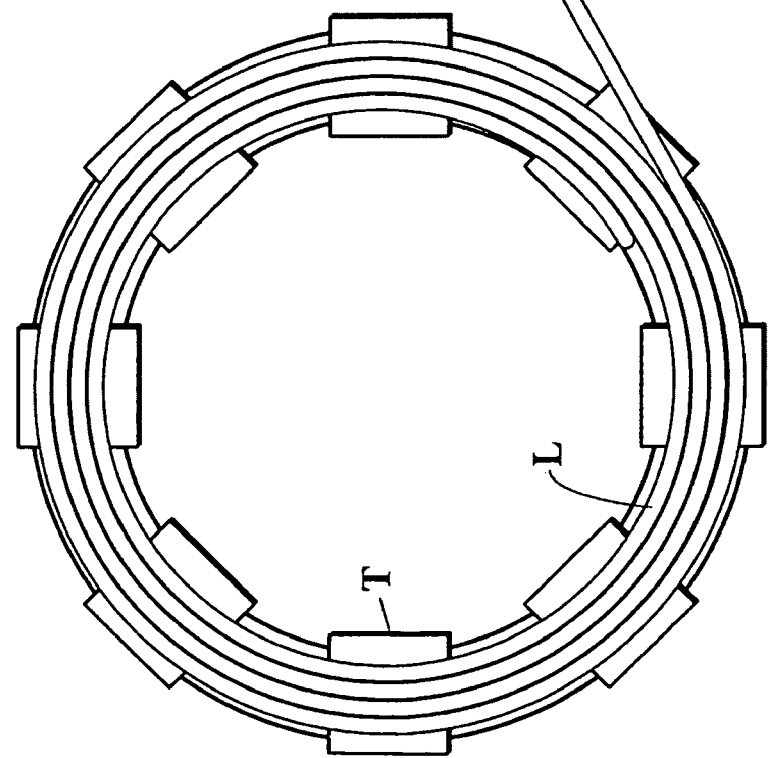
*Fig. 3*
*(PRIOR ART)*

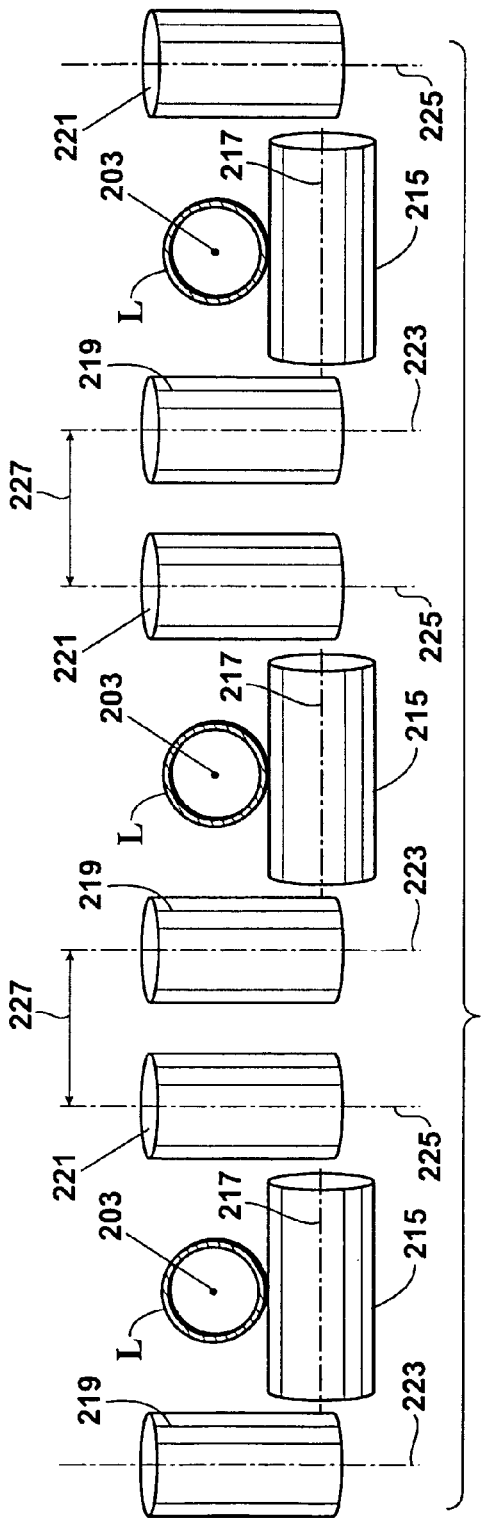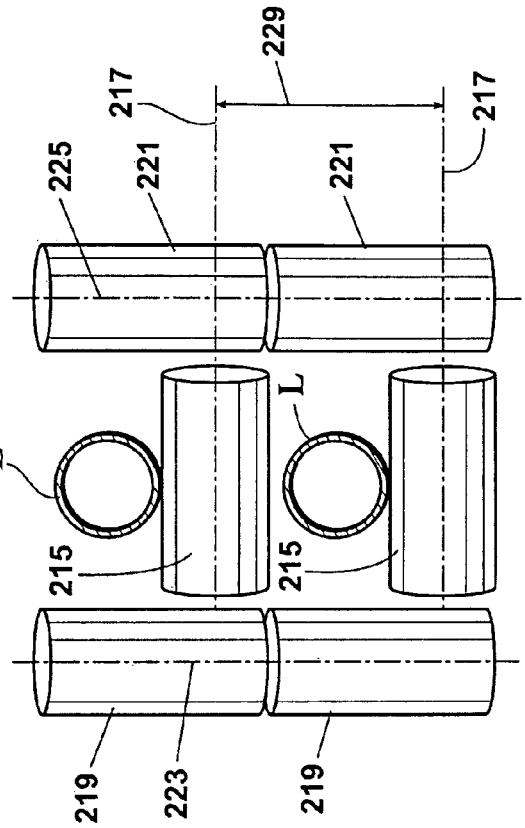

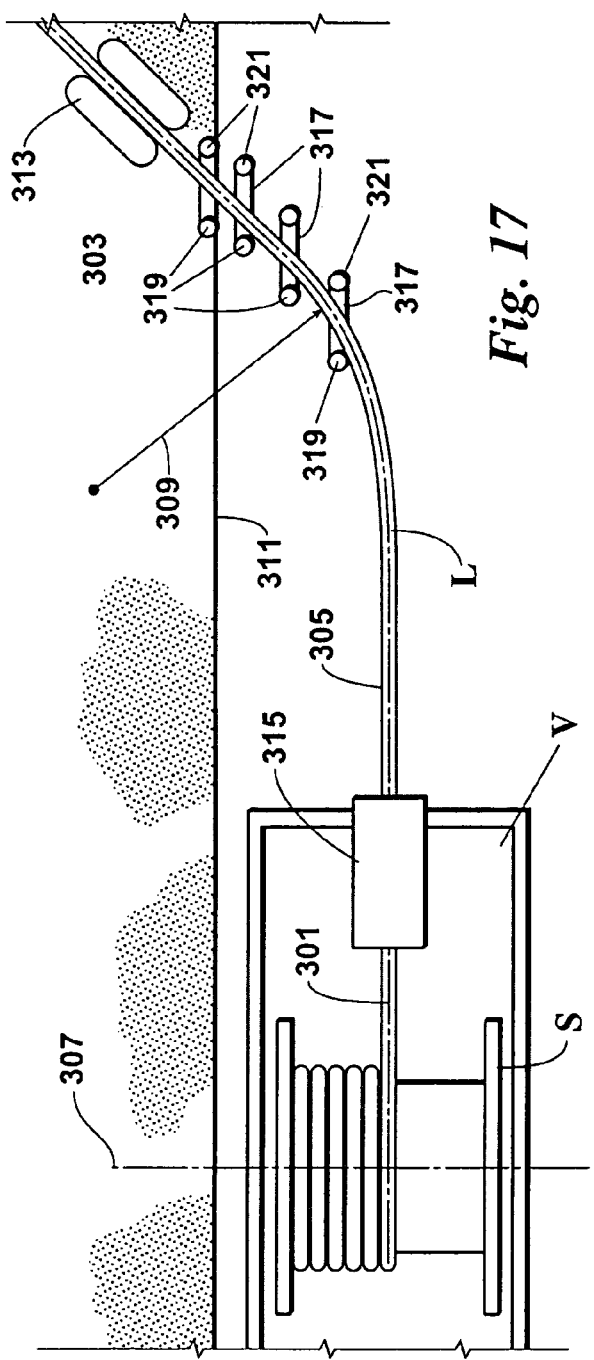
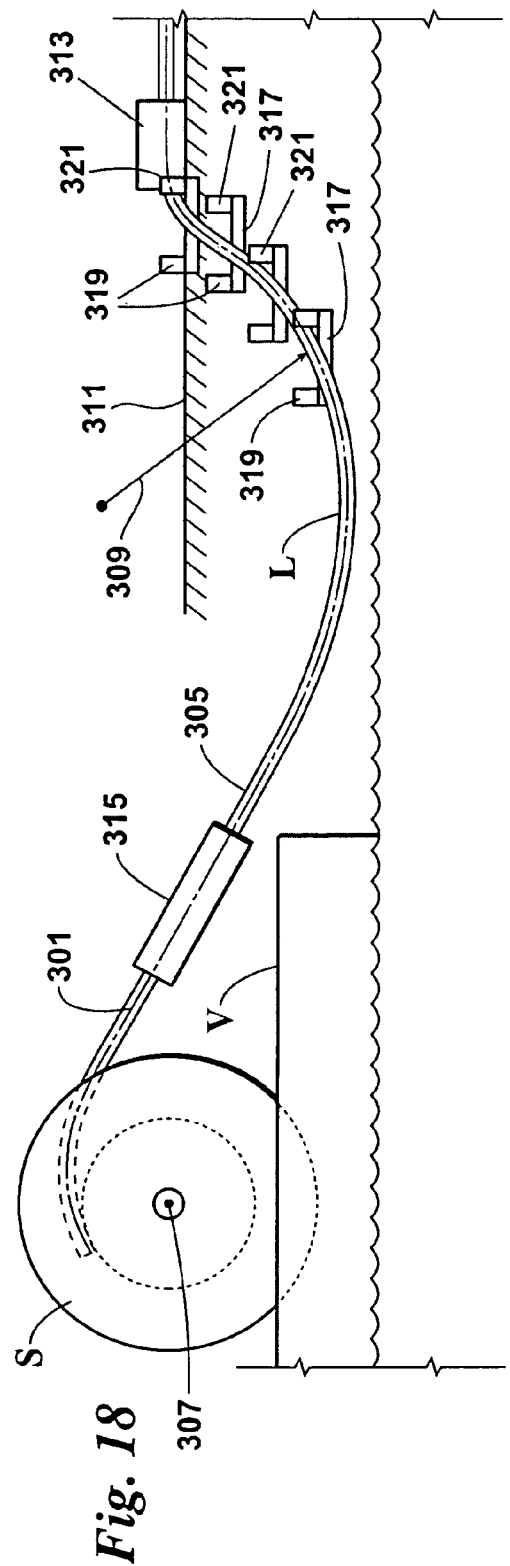

METHOD FOR STORING, DELIVERING AND SPOOLING PREASSEMBLED PIPELINES

BACKGROUND OF THE INVENTION

This invention relates generally to pipelines and more particularly concerns the storage, delivery and spooling of pipelines which have been preassembled for laying at a remote location, such as underwater pipelines used in off-shore well production systems.

The first off-shore pipeline was laid in the Gulf of Mexico in 1954 using conventional land-based pipe laying methods at sea. As seen in FIG. 1, stalks K are formed by on-shore welding of two or three sections of pipe P and coating and testing the welds. The stalks K are then loaded onto relatively small boats B for delivery to an at-sea navigable site such as a barge or ship. There the stalks K are welded end-to-end to each other in a horizontal orientation and these new welds coated and tested for release to the sea, one stalk at a time, in what is a tediously slow "S-lay" process, "S" describing the path of the pipeline as it leaves the floating site. This at-sea application of the land-based conventional method remains in use today but, primarily because of increased possibilities of pipeline failure resulting from the "S-lay" pipeline release path, it is generally used only for laying pipe in shallower water less than 1000' deep. Assuming the water depth is shallow, the at-sea barge or ship may also be relatively small because the length and weight of pipe on board at any given time is minimal. But, the stalk joining time can take from 20 minutes to 2 hours per joint, depending on materials, dimensions, welding procedures, inter-pass temperatures, coatings, liners, pipe-in-pipe applications and related considerations.

In the late 1960s, spool-based pipeline systems came into use. According to the spool-based method, looking at FIG. 2, the stalks K or sections of pipe P are delivered to an on-shore facility near the docking point where they are individually joined and reeled onto a ship-board spool S. This is also a tediously slow process because reeling must stop at each joint while the stalks K or sections of pipe P are welded, coated and tested. The sections of pipe P are typically in short lengths, perhaps 40', and the stalks K somewhat longer, perhaps as much as half a mile long. In one recent case, a 1.25 mile long linear site was specially built at a cost of approximately $30,000,000. The reeled pipelines L are often as much as six miles long or more, depending on the pipe diameter and wall thickness. As a result, considerably larger and more expensive vessels V are required to transport the spool S to the at-sea pipeline laying location. Moreover, the spool-carrying vessel V is designed and its supporting equipment positioned so that the completed pipeline L will be dispensed over the stern of the vessel V as it travels. As a result, these spool-carrying vessels V also require stern loading. Therefore, they must be moored substantially stern-on in the harbor to receive the pipeline L from the welding facility axially in the direction of the keel which is transverse to the reel rotational axis. The resulting in-harbor time and space requirements for the vessel V make it generally difficult and sometimes impossible for conventional harbors to accommodate the spool-based process. Even when the harbor can accommodate the vessel V, the method essentially transfers the lengthy at-sea welding and coating process to the seashore, so that an extremely expensive vessel V, as well as related harbor facilities, are operationally idle for days as pipeline is being welded, coated and reeled. On many projects, time spent in harbor can be as much as 10 days. Over the course of a pipe lay season, a reel lay vessel V may spend more than 80 days in harbor reeling stalks of pipe at a cost of approximately $400,000 per day.

In 1993, a "J-lay" variation of the conventional at-sea welding process was put into practice, "J" describing the path of the pipeline as it leaves the floating site. In "J-lay" systems, a tower on the floating site permits the pipe to be welded in vertical orientation. This enables the sea welding process previously limited to use in waters less than 1000' in depth to be used in waters many thousands of feet in depth but leaves the other above-mentioned conventional process problems unresolved.

Recently, a 2006 publication related to spool-based pipeline reeling suggests that the pipeline be welded and then stored at a land-based facility for future non-stop reeling onto a ship-board spool S. Such a system could reduce the idle time of the vessel V. However, according to the suggested system, as seen in FIG. 3, the pipeline L must be collected and stored on a synchronized train T of bogies driven on an endless circular track. While the train is circular, the pipeline L is spiralled onto the train T. The constant variation of the spiralling pipeline radius is practical only for elastic bending of the pipe. It is also suggested that pipelines could be stacked in layers spaced by timber battens, but only the topmost layer of the stack could be accessed at any time. To transfer the stored pipeline L to a vessel V, the pipeline L, or the topmost pipeline if pipelines are stacked, would be unloaded from the endless track T onto a tangent path for straight-line transfer to a nearby stern-moored vessel V. This combination of preconditions would increase the already existing difficulty in finding geographically and geometrically suitable sites for spool-based operations. A suitable site could be as much as five or more days' vessel run from the pipeline lay area. Increased sailing time would greatly offset any weld time saved by use of the system. The resulting disadvantages more than offset any benefits that might result from use of the bogie train spool-based system.

In a more recently suggested stacked pipeline system, the pipeline would be coiled under itself in circular, concentric circular or spaced semi-circular configurations, as seen in FIGS. 4A-C, respectively. This system eliminates the constantly variable spiral radius of the pipe bend in the track-and-bogie system. However, in each of these configurations, each succeeding coil would lift and support the weight of each and every preceding coil. As with the track-and-bogie system, in-take and out-take to and from the coils would be tangential to the loop and straight line to both the weld station (not shown) and to the stern of the vessel V. The choice of site would be limited to those able to accommodate at least the size of a circular loop having the elastic bending radius of the pipeline L and also to afford a straight line path tangent to the loop and perpendicular to the reel rotational axis of the spool S on the stern-moored vessel V. Stacking identical coils of pipe would require use of the same radius and identical loop path for the entire stack. The weight of the stacked loops would increasingly challenge the integrity of successively lower loops and would make pipe-in-pipe or multiple pipe applications highly impractical. The stacked coils could not accommodate partial radii and, therefore, the pipeline L could not be bent in all possible directions. Pipeline or weld repairs could not be made to the coiled pipeline, nor would it be possible to move a repair point on a coil to a designated repair location without unwinding and/or breaking a welded joint. Stacking is proposed to be accomplished by insertion of a new lowermost coil between stack-supporting rollers and the next lowermost coil to lift the already stacked coils as the pipeline is pushed under the bottom of the stack, an impractical if not impossible task. The order of loadout from a looped stack could not be changed because, once the pipeline was stacked, the lower loops could not be accessed or retrieved until the higher loops were remove from the stack. Even if this order could be changed, pipelines of different diameter $L_1$ and $L_2$ could not be stored in the same stack. For example, a 4" pipe being pushed under a 10" pipe would create an unstable condition. Retrieval of the pipeline from the loop would be likely to damage the stack-supporting rollers or the pipe because of the weight of the stack. Retrieval of the pipeline from the loop is likely to damage rollers used to guide the pipeline or the pipe because one section of the pipeline would want to elastically turn against the last guiding roller while the other elastically bent sections were holding the roller in place. As the pipeline relaxes from the loop, it would want to describe a curve of increasing radius and either force its way off the exit rollers or, if restrained, cross over at the loop exit so that the top layer would be forced off the inside of the loop. Some of the loops would occasionally want to fall off the supporting rollers, especially if there were only one guiding roller. This is so because, in practice, line pipes have quite different strengths from batch to batch and would push the pipeline off the rollers, especially when going from bent to straight and vice versa. The stacked loops might push down on the bottom coil sufficiently to force it off the roller system or into a tangle or might put sufficient load on the bottom and intermediate coils to eventually cause damage to the coatings or field joints on the bottom coil as it crosses the supporting rollers. Moreover, stacked loops would eventually buckle the pipeline between the welding station and the loop as the tensioner pushes the stacked load. Any vertical deviations in a coil would be magnified in successive coils so three dimensional circumnavigation of any obstacles in the coil path would be impractical. The stacked coil roller support and guide structure would require such considerable strength to handle its multiple loops that the system would lack portability. Thus, the stacked coil variation of the bogie train spiral has concomitant disadvantages which would mitigate greatly against its use in a spool-based system.

Thus, despite the efforts to devise a more practical method and system, the present state of undersea pipeline technology is limited to "S-lay" and "J-lay" weld-at-sea methods or seashore weld-and-reel methods. Both are relatively inefficient and expensive and, with respect to off-shore oil production applications, add significantly to an already burdensome consumer cost.

It is, therefore, an object of this invention to provide a method for storing, delivering and spooling pipelines which speeds up spooling times. Another object of this invention is to provide a method for storing, delivering and spooling pipelines which reduces the occurrences of disruption during the spooling operation. Still another object of this invention is to provide a method for storing, delivering and spooling pipelines which reduces in-harbor idle time for pipe-lay vessels. A further object of this invention is to provide a method for storing, delivering and spooling pipelines which reduces the risk of weld failures. Yet another object of this invention is to provide a method for storing, delivering and spooling pipelines which gives access to a greater choice of spool-base sites. It is also an object of this invention to provide a method for storing, delivering and spooling pipelines which eliminates the need for stem-on or angled mooring of spooling vessels. A further object of this invention is to provide a method for storing, delivering and spooling pipelines which makes complex jointing systems, such as pipe-in-pipe and high Cr content, more attractive for reel lay. Another object of this invention is to provide a method for storing, delivering and spooling pipelines which does not require that a stored pipeline come into spiralled or coiled contact with itself or other pipelines. Still another object of this invention is to provide a method for storing, delivering and spooling pipelines which utilizes a discrete point-to-point storage path which the pipeline traces. A further object of this invention is to provide a method for storing, delivering and spooling pipelines which is capable of including multiple radii in a pipeline storage, delivery or spooling-path. Yet another object of this invention is to provide a method for storing, delivering and spooling pipelines which can accommodate partial radii permitting the pipeline to be bent in all available directions. It is also an object of this invention to provide a method for storing, delivering and spooling pipelines which permits pipeline or weld repairs to be performed anywhere on the pipeline storage path. Another object of this invention is to provide a method for storing, delivering and spooling pipelines which permits movement of a repair point on a pipeline storage path to a repair location. Yet another object of this invention is to provide a method for storing, delivering and spooling pipelines which permits coupling a traditional spoolbase or straight rack to its pipeline storage path. It is also an object of this invention to provide a method for storing, delivering and spooling pipelines which enables selective retrieval of pipeline portions from storage. Another object of this invention is to provide a method for storing, delivering and spooling pipelines which allows various diameter pipelines to be stored end-to-end and retrieved as desired. Still another object of this invention is to provide a method for storing, delivering and spooling pipelines which supports the stored pipeline directly on rollers. A further object of this invention is to provide a method for storing, delivering and spooling pipelines which is tolerant of mismatched pipe strengths on a joint-by-joint basis. Yet another object of this invention is to provide a method for storing, delivering and spooling pipelines which allows the stored pipeline to circumnavigate obstacles on the storage site or along the delivery route in three dimensions. And it is an object of this invention to provide a method for storing, delivering and spooling pipelines which enables use of portable pipeline storage, delivery and spooling path components.

SUMMARY OF THE INVENTION

In accordance with this invention, a method and system is provided for storing, delivering and spooling preassembled pipelines such as underwater pipelines used in off-shore well production systems.

The pipeline can be stored within the geometric confines of a storage site which is comparatively small in relation to the length of pipeline to be stored, increasing the number of available sites for this purpose. In practice, a minimum bending radius of the pipe is selected. A maximum length of the pipeline to be stored is determined. A fixed, winding, linear path is defined which can be contained within the space available above the geometric area of a possible site. The fixed, winding, linear path will have a length not less than the determined maximum length of the pipeline and will have no turns of radius less than the selected minimum bending radius of the pipeline. The determined minimum bending radius may be a plastic bending radius of the pipeline or an elastic bending radius of the pipeline. The path may wind so as to overlap itself, as long as a pipeline tracing the path does not come into contact with itself. The pipeline is caused to trace the fixed, winding, linear path until the entire pipeline is on the path.

To deliver a preassembled pipeline from its stored location to a remote destination, such as a shipboard spool, a minimum bending radius of the pipeline is selected and a fixed, winding, linear path defined which connects the storage location to the destination. The defined path has no turns of radius less than the selected minimum bending radius of the pipeline. The selected minimum bending radius may be a minimum plastic deformation radius of the pipeline or an elastic bending radius of the pipeline. The pipeline is caused to trace the path until a leading end of the pipeline has travelled from the first location to the second location.

If a delivered pipeline is to be reeled onto a spool, the path on which the pipeline will approach the spooling area is identified. A minimum bending radius of the pipeline is selected and a curved approach path defined from an initial approach point proximate the shoreline at the spool to a final approach point to the spool. The determined minimum bending radius may be a plastic deformation radius of the pipeline or an elastic bending radius of the pipeline. The curved portion of the approach path turns to align the final approach to the spool in substantially perpendicular relationship from the final approach point to the rotational axis of and for intersection with the spool. The curved path has no turn of radius less than the determined minimum bending radius of the pipeline and preferably has a single circular turn with a compound radius, the compound radius having no radial component which is less than the selected minimum bending radius. The pipeline is caused to trace the spool approach path until, as the pipeline is reeled onto the spool, a trailing end of the pipeline has exited the spool approach path. If the spool is a ship-board spool, the spool approach path permits the ship to be docked in a non-stem-on orientation in the harbor.

Whether in the storage, delivery or spool approach path, tracing may be caused by propelling the pipeline to travel on supporting rollers displaced in fixed positions along and rotating on axes transverse to the defined path while directing the travelling pipeline to travel on the supporting rollers with guiding rollers displaced in fixed positions along and rotating on axes transverse to the defined path. Alternatively, tracing may be caused by propelling the pipeline to travel on supporting rollers displaced along, mounted to and rotating on axes transverse to the pipeline while directing the travelling pipeline with a guide preventing diversion of the supporting rollers from the defined path. The guide may, for example, be a channel in which the supporting rollers travel or a rail or beam on which the supporting rollers are engaged. Whether the rollers are fixed along the path or to the pipeline, propelling may be accomplished by pulling or pushing the pipeline to trace the defined path.

The determined bending radius for storing, delivering and reeling will be within the range of plastic deformation radii of the pipeline so as to assure that the pipeline can be straightened under tension as it exits a bend. Preferably, the determined bending radius will be within the range of elastic bending radii of the pipeline so as to assure that the pipeline will not require tensioning to straighten.

BRIEF DESCRIPTION OF THE DRAWINGS

Other objects and advantages of the invention will become apparent upon reading the following detailed description and upon reference to the drawings in which:

FIG. 3 is a block/plan view illustrating pipe storage pursuant to a proposed "spiraled" spool-based pipe laying method discussed in the Background of the Invention;

FIG. 10 is a cross-sectional view taken along the line 10-10 of FIG. 6;

FIG. 11 is a cross-sectional view illustrating multi-level storage of a pipeline according to the present invention;

FIG. 17 is a block/plan view illustrating the spooling method of the present invention;

FIG. 18 is a block/elevational view of the spooling method of FIG. 17;

While the invention will be described in connection with a preferred embodiment thereof, it will be understood that it is not intended to limit the invention to that embodiment or to the details of the construction or arrangement of parts illustrated in the accompanying drawings.

DETAILED DESCRIPTION

As herein before discussed in relation to FIGS. 1-4, according to the present state of the art of pipeline reeling, from the time the pipe is welded until it is reeled onto a spool, a pipeline, if bent at all, is bent only at radii greater than its elastic bending limit. The pipeline is assembled on a site close to the spool while it is being reeled along a substantially straight-line path from the point of assembly to the spool. The spool is usually located on a ship docked stem-on in a harbour so that the pipeline takes a straight-line path to the spool. The first time the pipeline is subjected to plastic bending is when the pipeline is reeled onto the spool. The reeled pipeline is later mechanically straightened during the laying process as it is unreeled from the spool.

Figure 1:
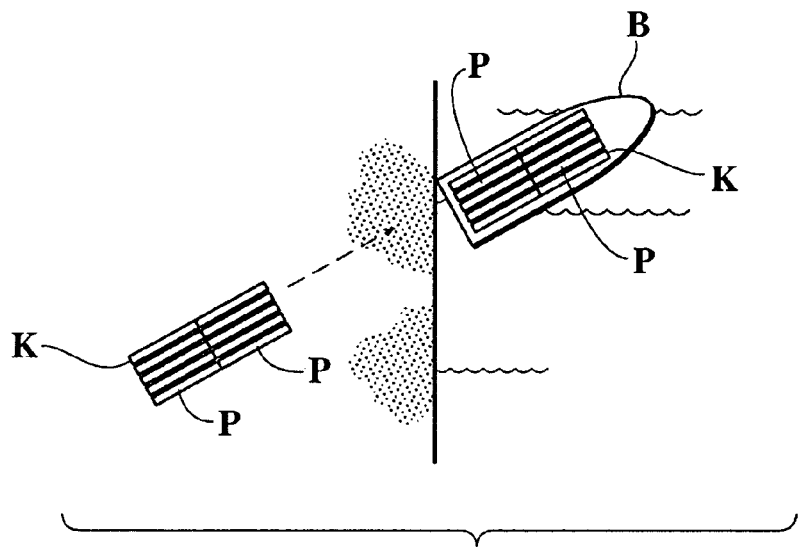
FIG. 1 is a block/plan view illustrating pipeline storage pursuant to conventional land-based pipe laying methods discussed in the Background of the Invention.
Figure 2:
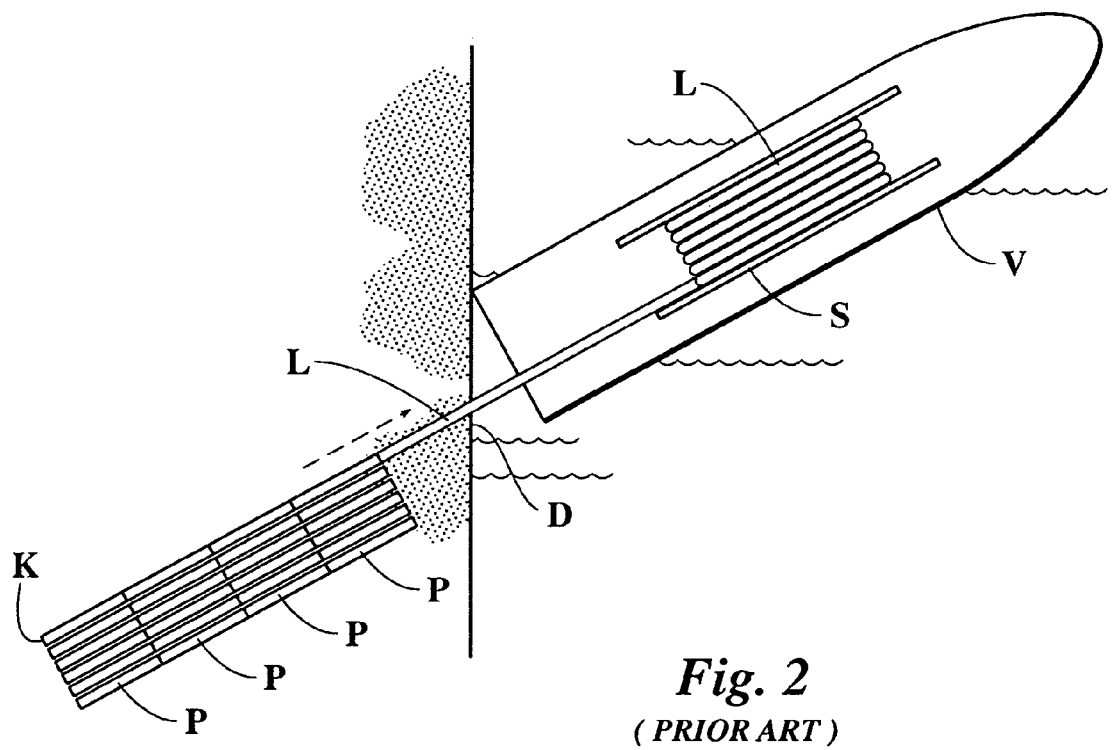
FIG. 2 is a block/plan view illustrating pipe storage pursuant to early spool-based pipe laying methods discussed in the Background of the Invention.
Figure 4:
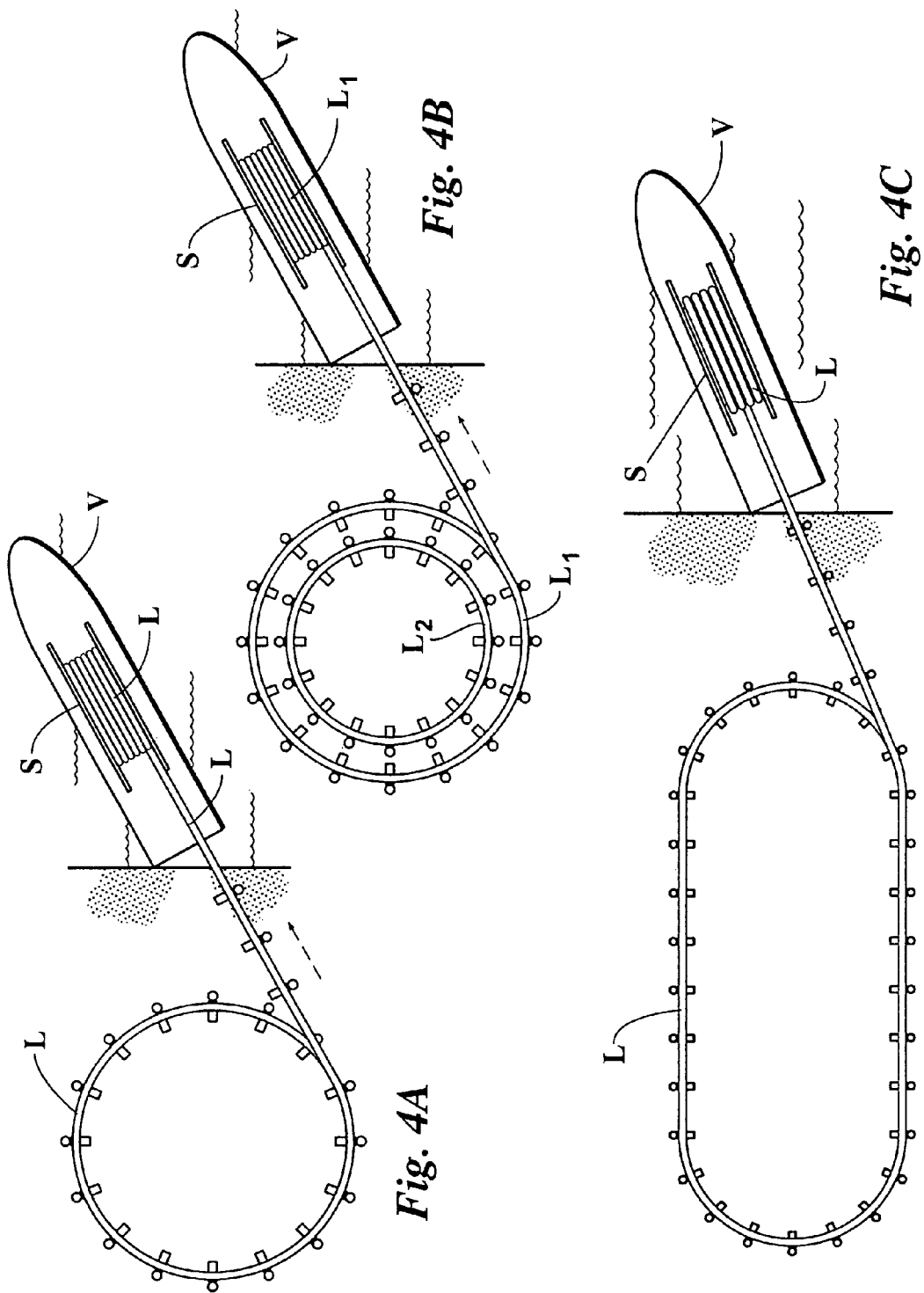
FIGS. 4A, 4B and 4C are block/plan views illustrating circular, concentric nd spaced semi-circular pipe storage, respectively, pursuant to a proposed "coiled" spool-based pipe laying method discussed in the Background of the Invention.
Figure 5:
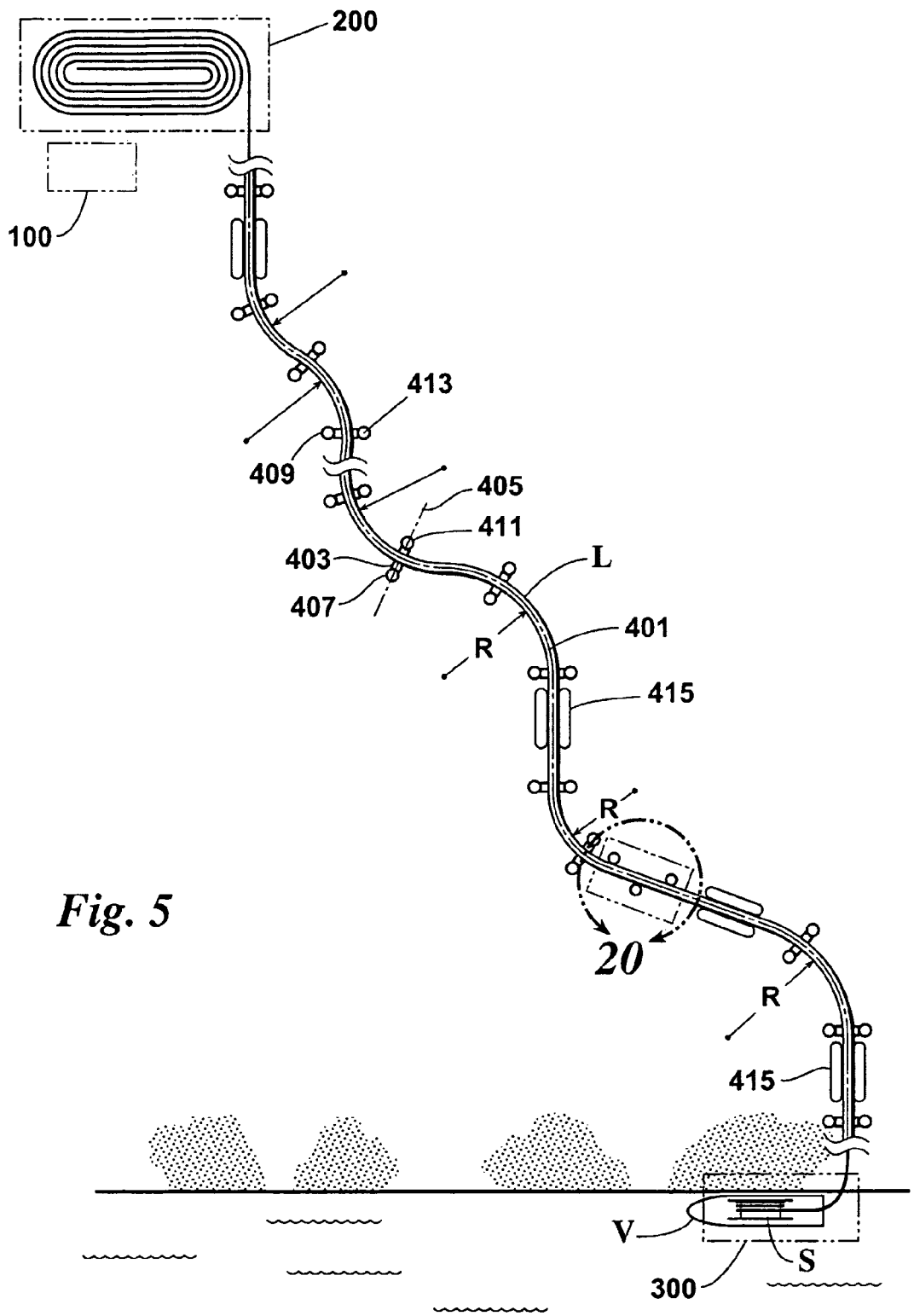
FIG. 5 is a block/plan view of a path implementing the storing, delivering and spooling method of the present invention.

According to the present invention, looking at FIG. 5, a pipeline L will be stored on a storage site 200 for future transfer to a remote shoreline site 300 along a delivery path 400 for reeling onto a ship-board spool S. All of this is accomplished by a method of storing, delivering and reeling in which the pipeline traces fixed paths. The fixed paths can be substantially omni-directional, so that the pipeline can navigate terrain that may be sloped, contoured or have immovable obstacles, can be directed so as to never come into contact with itself, so that the pipeline is, at all points, accessible for retrieval or repair, and can be contained on a variety of relatively small and different geographically contoured sites, increasing the options in system design. As herein used, "path" indicates the desired location of the centerline of a supported pipeline L.

The Storing Method

Figure 6:
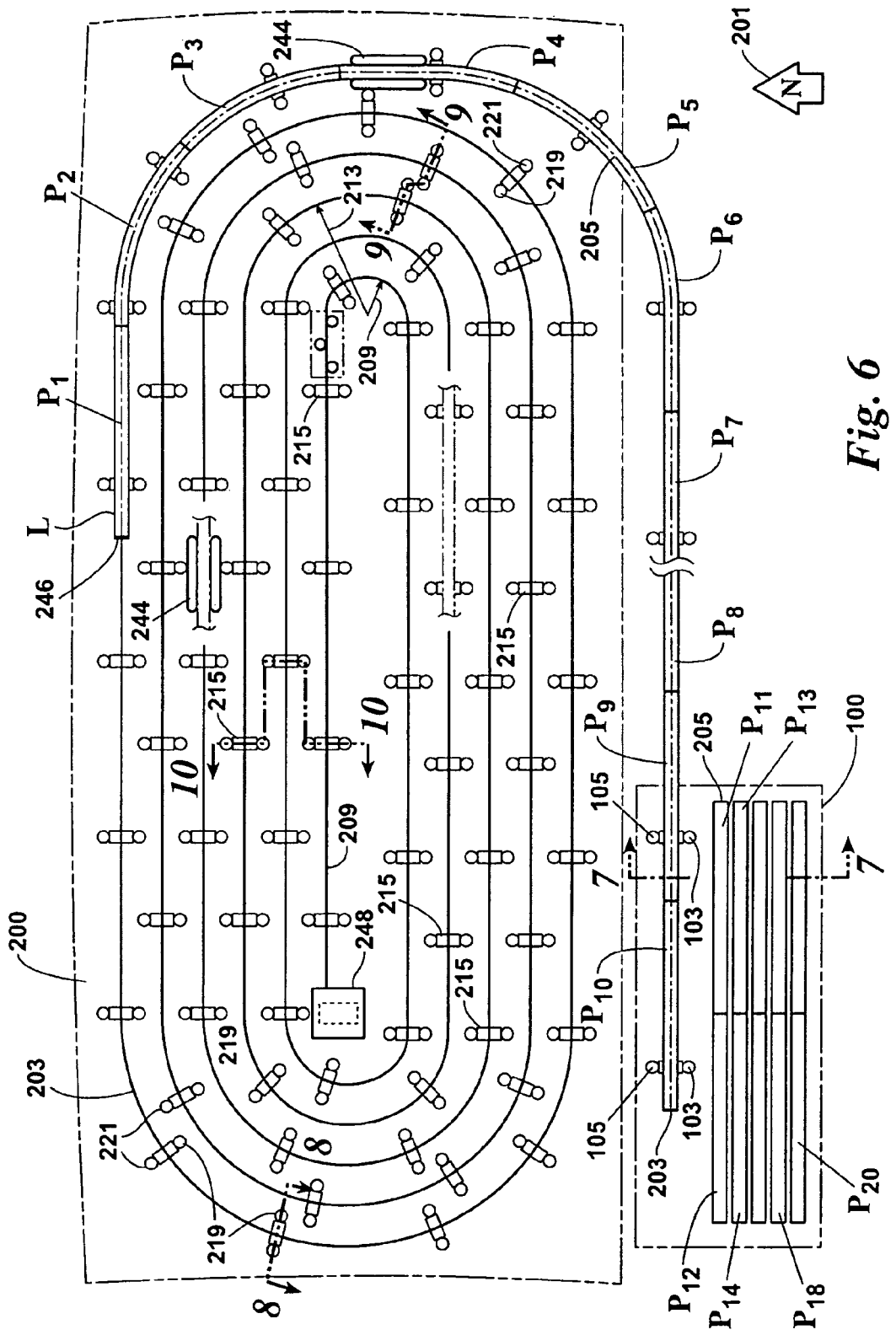
FIG. 6 is a block/plan view of the welding and storage paths of FIG. 5.
Figure 7:
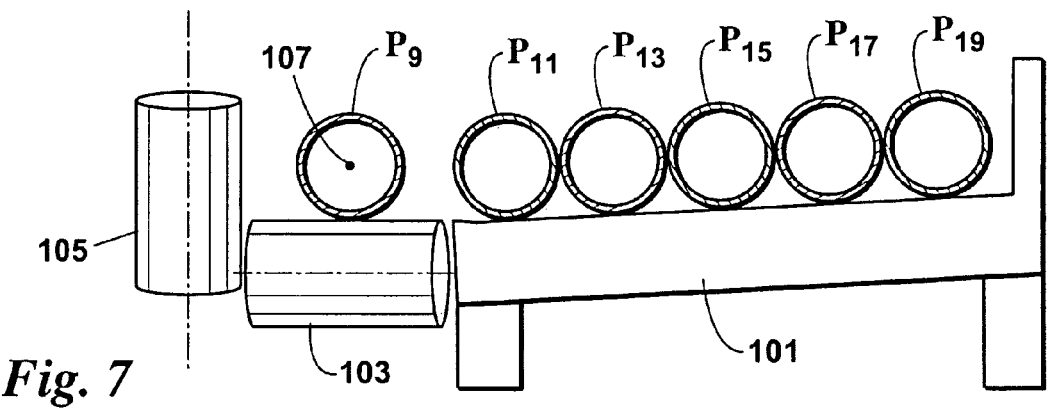
FIG. 7 is a cross-sectional view taken along the line 7-7 of FIG. 6.
Figure 8:
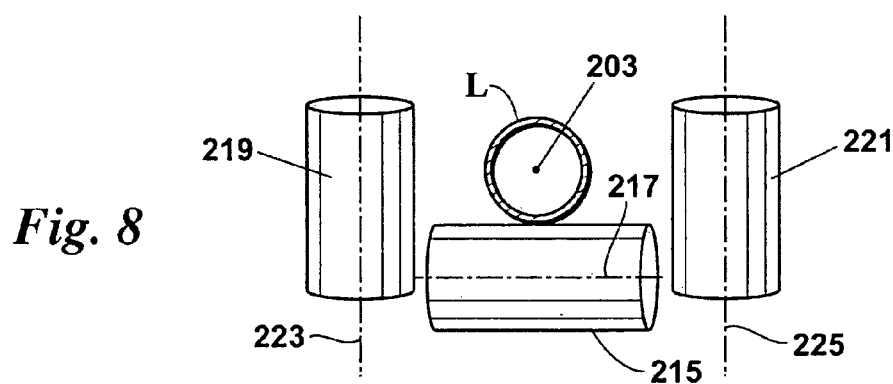
FIG. 8 is a cross-sectional view taken along the line 8-8 of FIG. 6.

Turning to FIG. 6, in forming the pipeline L for storage, stalks K consisting of pre-welded sections of pipe $P_{11}$ and $P_{12}$, $P_{13}$ and $P_{14}$, $P_{15}$ and $P_{16}$, $P_{17}$ and $P_{18}$ and $P_{19}$ and $P_{20}$ and so on are stored on a weld site 100. As shown, the weld site 100 is located separately from the pipeline storage site 200. However, the weld site 100 could also be located on the storage site 200, as will be hereinafter explained. The welding phase of the pipeline formation process is well known, but since the storage method is directly related to the welding phase of pipeline assembly, some explanation is warranted. Looking at FIGS. 6 and 7, the separate stalks K are stored on a pipe rack 101 from which they are sequentially loaded onto horizontal rollers 103. Vertical rollers 105 prevent the stalks K from rolling off the rollers 103 and help to guide the stalks K into longitudinal alignment with previously loaded stalks K which have been advanced along the welding path 107. As shown, some stalks K, consisting of pre-welded sections of pipe $P_1$ and $P_2$, $P_3$ and $P_4$, $P_5$ and $P_6$, $P_7$ and $P_8$ and $P_9$ and $P_{10}$, have already been welded end-to-end to form a pipeline L to which the free stalks K at the weld site 100 can be added, extending the pipeline L to its determinal maximum length. To arrive at the condition of the pipeline L shown in FIG. 6, the first stalk K, consisting of two pipes $P_1$ and $P_2$, was aligned on the pipeline path 107 of the weld site 100 and was advanced on the path 107 to clear the way for the next stalk K, consisting of two pipes $P_3$ and $P_4$, to also be aligned on the pipeline path 107. The trailing end of the first stalk and the leading end of the second stalk were then welded to begin the pipeline L. The pipeline L was then advanced and the third stalk K, consisting of two pipes $P_5$ and $P_6$, similarly added to extend the pipeline L, and so on, until the stalk K consisting of the last two pipes $P_9$ and $P_{10}$ were welded into the pipeline L. Each of the welds is coated and tested during this preliminary process. The advancement of the pipeline L during the formation process can be accomplished by pulling the leading end of the first pipe $P_1$ with a bulldozer or winch line, or by pushing or pulling the pipeline L with one or more prime movers at selected points along the pipeline travel path, as hereinafter discussed.

The weld site 100 could be located on the storage site 200 at any position along the path 203. For example, looking at FIG. 6, the weld site 100 could be between any adjacent circuits of the path 203 or at the outside end of the path 203. In the between circuit layout, pipe sections or stalks could be welded and pulled in either or both directions from the weld site 100. In the inner end layout, welding at the inner portion of the site 200 would very efficiently use the storage site 200 because the smallest radius bends would surround the weld site 100.

Eventually, as the pipeline L is being formed, pursuant to the present invention, it will be advanced on to a storage site 200, shown in FIG. 6 as an area of irregular perimeter, with a north arrow 201 provided for convenience in describing the storage method. In present practice, the storage path 203 would have to be circular or semicircular with at least the elastic bending radius of the pipeline L. Therefore, the site 200 would have to be at least large enough to accommodate a circle of radius greater than the elastic bending radius of the pipe. If the minimum elastic bending radius of this pipe was used, the weld site 100 could not be inside of the circle. As shown, the pipeline L will be stored within the geometric confines of a storage site 200 which is comparatively small in relation to the length of pipeline L to be stored. The dimensions of the storage site 200, the composition, diameter and thickness of the pipeline L, the intended environment and use for the pipeline L and other data related to the strength requirements of the pipeline L are among the factors that may be considered in selecting a minimum bending radius of the pipeline L. This minimum bending radius can, but need not be, in the elastic bending range of the pipeline L. The maximum length of the pipeline L to be stored may be established arbitrarily but more likely in regard to the length of the pipeline L ordered or the maximum length of pipeline L that can be stored on a reel, whichever is greater. Given the minimum radius and maximum length, a fixed, winding, linear path 203 can be defined within the vertical space available above the geometric area of the selected site 200. As shown, the fixed, winding, linear path 203 extends from a beginning point 205 on the site 200 to an end point 207 on the site 200. The path 203 shown in FIG. 6 has a minimum radius 209 which is not less than the selected minimum bending radius of the pipeline L and a length not less than the determined maximum length of the pipeline L.

In a first scenario, the storage site may be intended to be used only to store pipelines which have the same diameter for the entire length of pipeline, in which case it is necessary only to select a minimum bending radius for that diameter pipe. For the storage site 200 shown, the bending radius 209 at the innermost eastern turn must be at least as great as the selected minimum radius. In a second scenario, the storage site may be intended to be used to store only pipelines which are the same diameter for their entire length, but pipelines of different diameter may be stored from time to time. Then it is necessary only to select a minimum bending radius for the greatest diameter pipeline that will be stored. For the storage site 200 shown, the bending radius 209 must again be at least as great as the selected minimum radius. In a third scenario, the storage site may be intended to be used to store a single pipeline having sections with different diameters. The minimum bending radius of any section of the pipeline that may trace or be stored on the storage path 203 would be selected. For example, it may be desirable to store a pipeline which has a 4" diameter for one section of its length and an 8" diameter for its remaining length. The smaller diameter section can be advanced first on the path 203 so that the inmost eastern turn of the path 203 could have a selected radius 209 to accommodate the 4" diameter portion of the pipeline. As the larger diameter section follows the smaller diameter portion, if it is arbitrarily assumed that the 4" diameter section determined length would end on the third inner northern straight-away portion 211, the third inmost eastern turn of the path 203 would have a selected radius 213 to accommodate at least the 8" diameter section of the pipeline L.

The pipeline L will be caused to trace the fixed, winding path 203, at least until the entire pipeline L is on the winding path 203. The contour of the storage path 203 can assume any configuration provided the selected minimum radius and established length requirements are met and further provided that the pipeline L must be able to trace the path 203 as it advances on the site 200 until the entire pipeline L is on the path 203 and is not coiled or stacked on itself.

Figure 9:
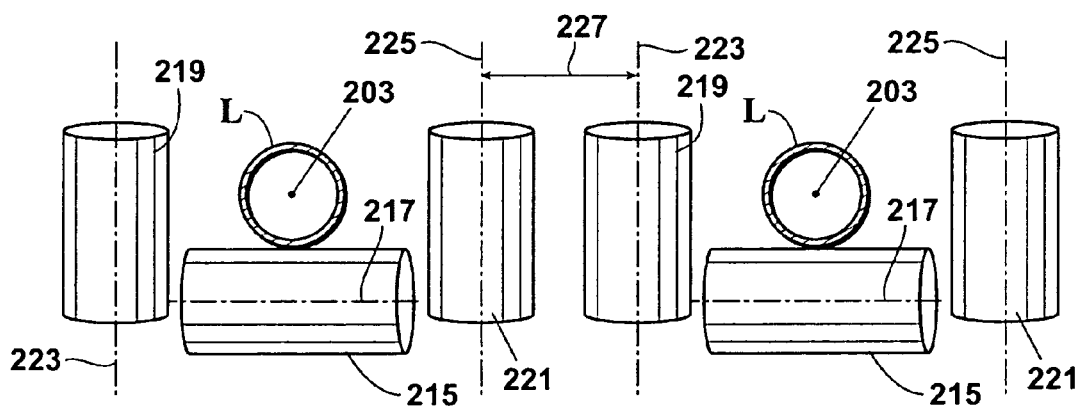
FIG. 9 is a cross-sectional view taken along the line 9-9 of FIG. 6.

As seen in FIGS. 6 and 8-10, tracing may be caused by propelling the pipeline L to travel on supporting rollers 215 displaced in fixed positions along and rotating on axes 217 transverse to the defined path 203 and directing the travelling pipeline L to travel on the supporting rollers 215 by use of inside and outside guiding rollers 219 and 221, respectively. The guiding rollers 219 and 221 are also displaced in fixed positions along and rotating on axes 223 and 225, respectively, transverse to the defined path 203. Preferably, the guiding roller positions correspond to the supporting roller positions. As shown, the supporting rollers axes 217 are substantially horizontal and the guiding roller axes 223 and 225 are substantially vertical, but these axes 217, 223 and 225 may be otherwise oriented as long as they perform their supporting and guiding functions and provided that the rollers define the storage path 203 that will be traced by the pipeline L. The supporting rollers 215 should be spaced at intervals different than the length of the sections of pipe in the pipeline L so that the weld points do not simultaneously coincide with the rollers 215 during tracing. The pipeline L cannot be coiled or stacked in contact with itself. Looking at FIGS. 6 and 8-10, the pipeline L travels on a path 203 illustrated as if the center axis of the pipeline L bisects the distance between the vertical axes 223 and 225 of the guiding rollers 219 and 221. However, the pipeline L may, as it travels, be anywhere between the guiding rollers 219 and 221, as long as the guiding rollers 219 and 221 provide lateral isolation of the pipeline L from itself, as best seen in FIGS. 9 and 10. The spaces 227 shown between an inside guiding roller 219 of one section of the pipeline L and outside guiding roller 221 of another section of the pipeline L are unnecessary as long as the pipeline L does not contact itself anywhere along the path 203. Similarly, looking at FIG. 11, in a multi-level path, the space 229 between the axes 217 of upper and lower level supporting rollers 215 can be such as to afford vertical isolation of the pipeline L from itself. Therefore, the path 203 can be defined within three-dimensional omni-directional limits, as will be hereinafter described.

Figure 12:
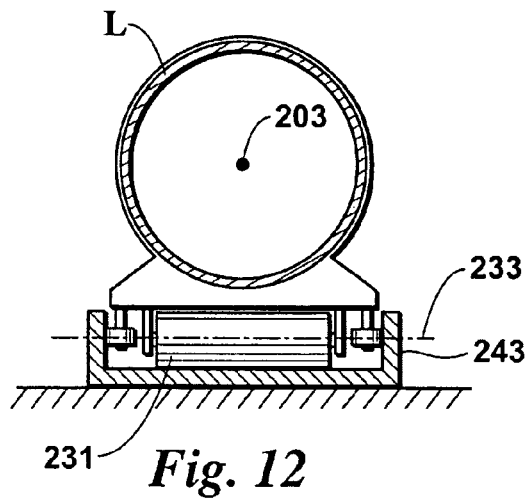
FIG. 12 is a cross-sectional view illustrating a channel-and-carriage pipeline storage or delivery path according to the invention.
Figure 13:
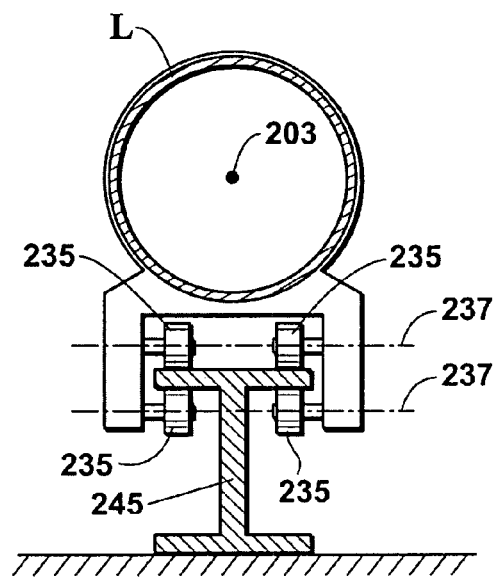
FIG. 13 is a cross-sectional view illustrating an over-slung monorail pipeline storage or delivery path according to the present invention.
Figure 14:
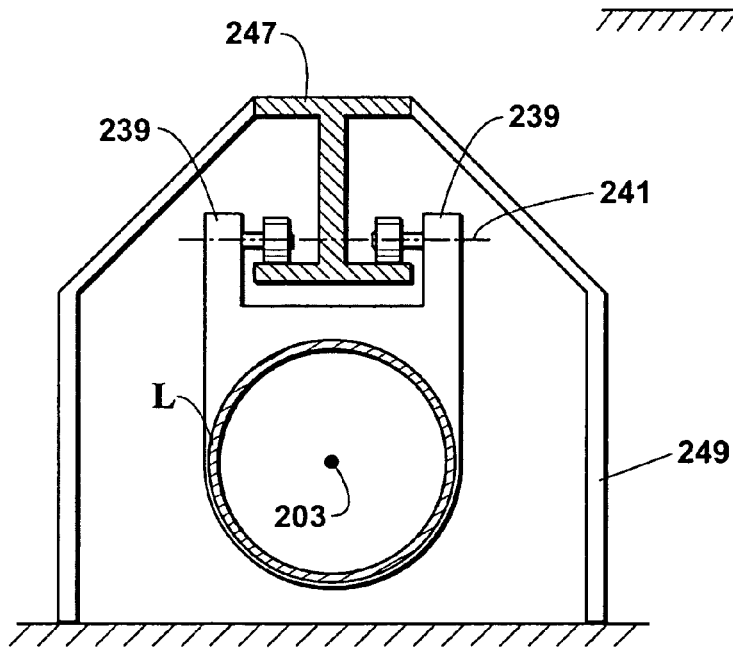
FIG. 14 is a cross-sectional view illustrating an under-slung monorail pipeline storage or delivery path according to the present invention.

Alternatively, looking at FIGS. 12-14, tracing of the storage path 203 by the pipeline L may be caused by propelling the pipeline L to travel on supporting rollers 231, 235 or 239 displaced along, mounted to and rotating on axes 233, 237 or 249, respectively, transverse to the pipeline L and directing the travelling pipeline L with a guide 243, 245 or 247, respectively, preventing diversion of the supporting rollers 231, 235 or 239 from the defined path 203. Propelling may be accomplished by pulling or pushing the pipeline L to trace the defined path 203. The guide may, for example, be a channel 243 in which the supporting rollers 231 travel, as shown in FIG. 12, or an I-beam 245 or 247 on which the supporting rollers are engaged with the pipeline L slung over or under the guide, as shown in FIGS. 13 and 14, respectively. The guide may be ground supported, as seen in FIGS. 12 and 13, or elevated by a support structure 249, for example, as seen in FIG. 14. The guide 243, 245 or 247 must, however, enable the pipeline L to trace the path 203 as it advances on the site 200 until the entire pipeline L is on the path 203 and is not coiled against or stacked on itself. The path 203 may wind so as to overlap itself, provided that the pipeline L tracing the path 203 does not come into contact with itself. The selected minimum bending radius may be any plastic deformation radius of the pipeline L or any elastic radius of the pipeline L.

Looking at FIG. 6, the pipeline L may be caused to trace the path 203 by connecting a cable along the path 203 between a winch 248 at the end point 207 of the path 203 and the leading end 246 of the pipeline L, and pulling the pipeline L along the path 203. Alternatively, one or more prime movers 244, with a pipeline tensioner, may be stationed along the path 203 to push or pull the pipeline L on the path 203. The number, location and size of the tensioner is selected to efficiently disperse the applied force to the pipeline L.

Figure 15:
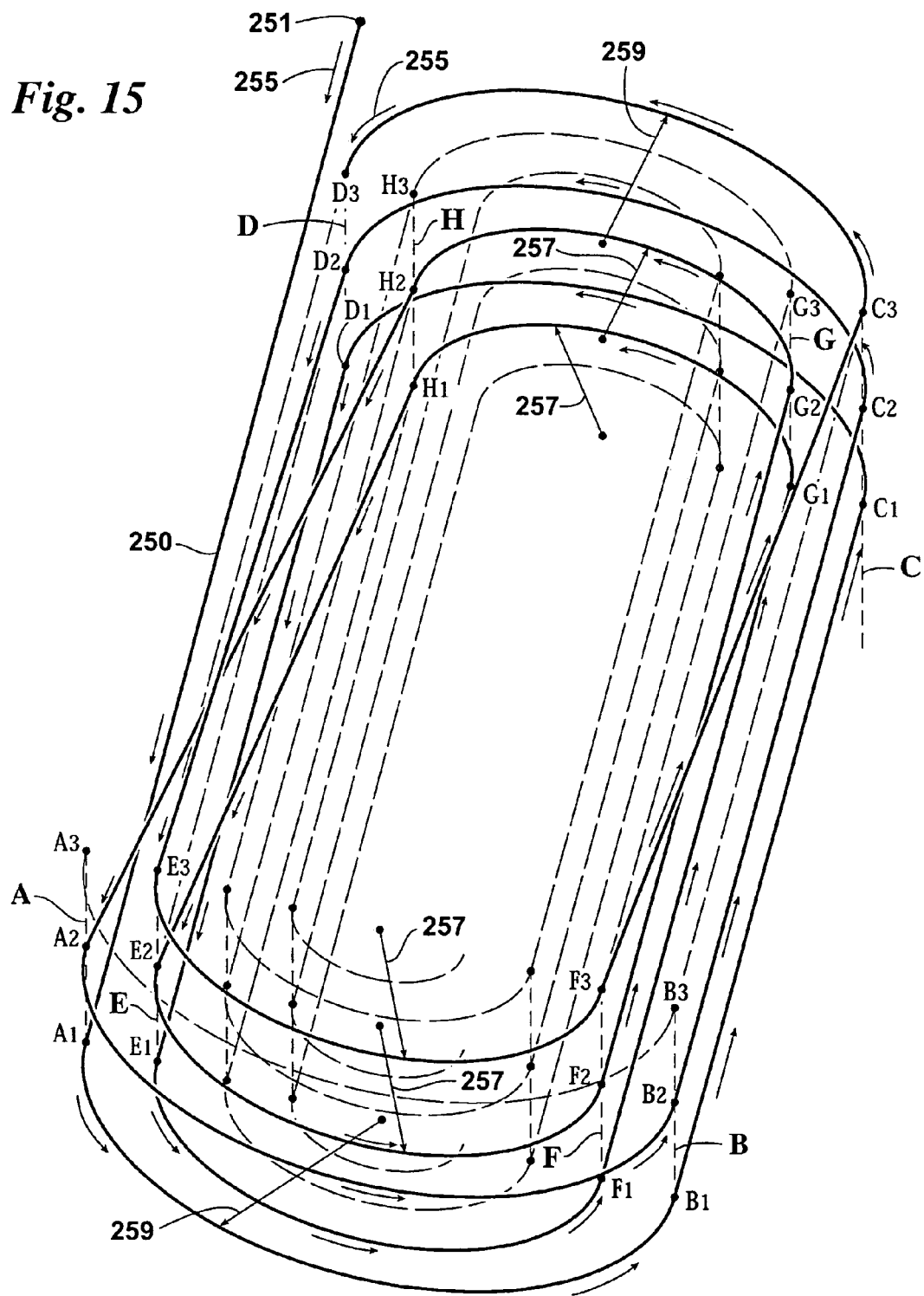
FIG. 15 is a perspective-like illustration of an omni-directional pipeline storage path according to the present invention.

Turning to FIG. 15, the three-dimensional omni-directional capability of the storage path 250 enables efficient use of the space 200 available and circumnavigation of terrain and obstacles that could preclude the use of a conventional spool-base. Assume that, by reason of the dimensions of the site 200, the minimum bending radius 257 of the pipeline and the length of the pipeline, approximately five circuits are needed in the path 250 to store the pipeline on the site that the site dimensions can horizontally accommodate only two such circuits. The path 250 will enter the storage site at a start point 251 and wind its way to an end point 253 in the storage loading direction 255. The path 250 passes sequentially through vertical axes A-H which are representative of supporting structure for the components of the storage path 250. The lower two circuits extend from the start point 251 through axis points $A_1$, $B_1$, $C_1$ and $D_1$, which complete the first or lower outer circuit, and $E_1$, $F_1$, $G_1$ and $H_1$, which complete the second or lower inner circuit. From the end point $H_1$ of the lower inner circuit the path 250 rises to an intermediate level defined by axis points $E_2$, $F_2$, $G_2$ and $H_2$, which complete the third or intermediate inner circuit, and shifts outwardly and extends through axis points $A_2$, $B_2$, $C_2$ and $D_2$, which completes the fourth or intermediate outer circuit. Finally, from the end point $D_2$ of the intermediate outer circuit, the path 250 again rises to a higher level defined by axis points $A_3$, $B_3$, $C_3$ and $D_3$, which completes the fifth or upper outer circuit. Supporting rollers 215 and guiding rollers 219 and 221 are located along the path 250 to maintain the pipeline on the path 250 without any turns having a radius less than the selected minimum bending radius 257 of the pipeline. Thus, it is seen that the path 250 can be defined by any conceivable, random, three-dimensional matrix of points which takes into account the selected minimum bending radius and the determined length of the pipeline.

Figure 16:
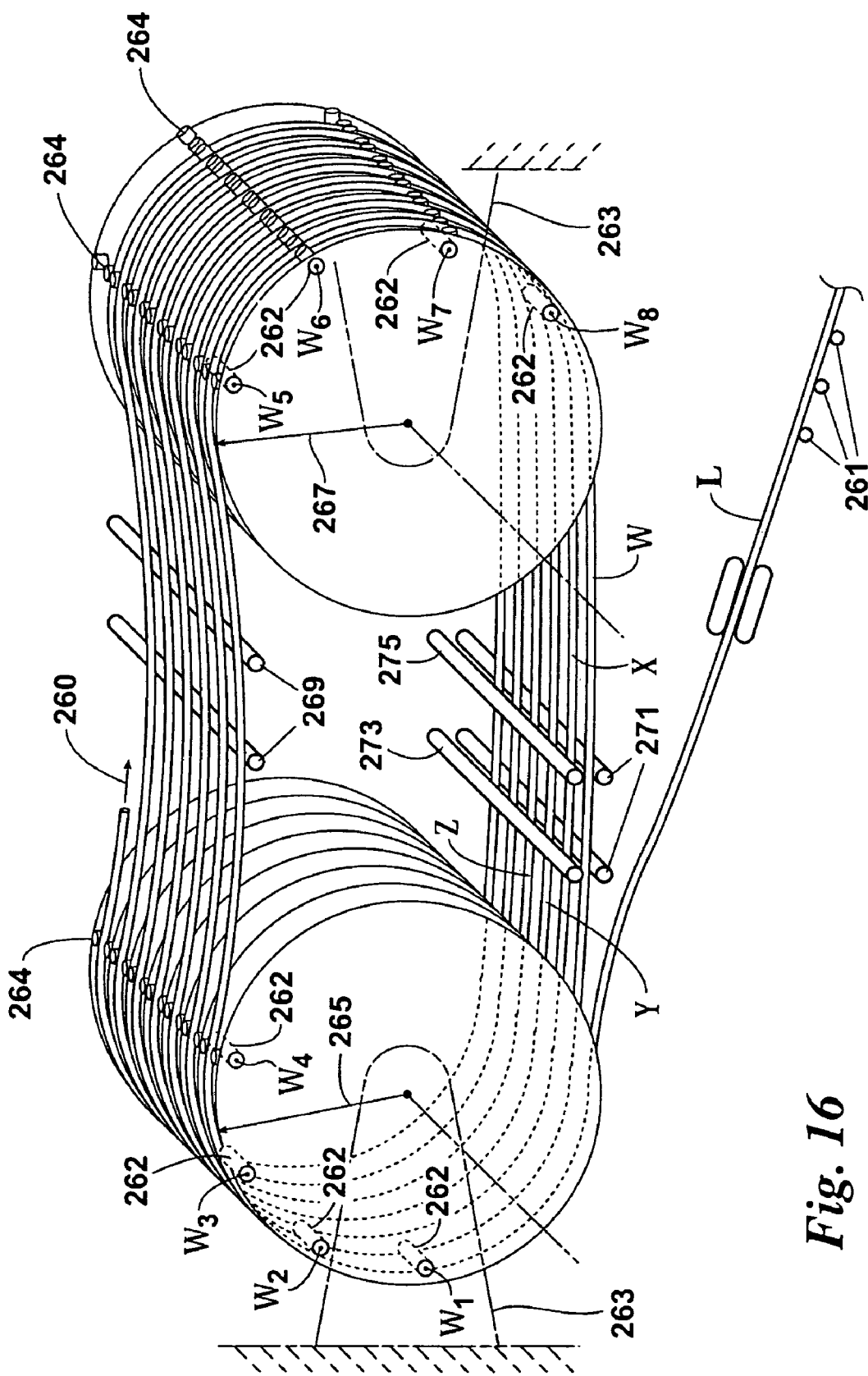
FIG. 16 is a perspective-like illustration of a vertically oriented pipeline storage path according to the present invention.

Turning to FIG. 16, the storage path 260 illustrates that, in accordance with the invention, a storage path, or part of a storage path, rather than being generally horizontally oriented, may be generally vertically oriented similar to a bicycle chain. The assembled pipeline L is received from upstream supporting rollers 261. A support structure 263 positions sets of supporting 262 and guiding 264 rollers, configured as hereinbefore described in relation to FIGS. 8-10, to define a helical matrix of points on the path 260 in helical circuits W-Z as shown. As shown, the first helical circuit W has four sequential, upward, quarter turn matrix points $W_1$, $W_2$, $W_3$ and $W_4$ and four sequential, downward quarter turn matrix points $W_5$, $W_6$, $W_7$ and $W_8$, each quarter turn having a minimum radius 265 or 267 not less than the selected minimum bending radius of the pipeline L. A set of supporting and guiding rollers will correspond to each matrix point. The support structure 263 may further position intermediate upper level supporting and guiding rollers 269 and lower level supporting and guiding rollers 271 and 273, as necessary, to support the weight of the pipeline L and control the spacing and sag of the pipeline L between the quarter turns.

Supporting 264 and guiding 266 rollers need not necessarily be in sets, but may, as hereinbefore noted, be located at independent locations provided the pipeline L is maintained substantially on the storage path 260 without violating the selected minimum bending radius and without coming into contact with itself.

Using the above principles, a storage path can be defined which will accommodate a multi-mile pipeline on a relatively small storage site while maintaining the integrity of the pipeline in relation to a selected minimum bending radius and also permitting access to all points and segments of the pipeline for repair and retrieval without unloading pipeline which is not to be repaired or retrieved.

Spooling

Turning to FIGS. 5, 17 and 18, if a pipeline L is to be reeled onto a spool S, the path on which the pipeline will approach the spooling area 300 is identified. A minimum bending radius of the pipeline L is selected and a compound arcuate spool approach path 301 defined from an initial approach point 303 proximate the spool S to a final approach point 305 to the spool S. The determined minimum bending radius may be a plastic deformation radius of the pipeline or an elastic bending radius of the pipeline. The compound arcuate path 301 turns to align the final approach to the spool S in substantially perpendicular relationship from the final approach point 305 to the rotational axis 307 of and for intersection with the spool S. The arcuate path has no turn of radius 309 which is less than the selected minimum bending radius of the pipeline L and preferably has a single turn which is circular. The pipeline L is caused to trace the spool approach path 301 until the pipeline L is reeled onto the spool S with a trailing end of the pipeline L having exited the spool approach path 301. Propelling may be accomplished by pulling or pushing the pipeline L. If the spool S is a ship-board spool, the path from the final approach point 305 to the spool S is preferably substantially parallel to the keel of the vessel V and the compound arcuate path 301 permits the vessel V to be docked in a non-stern-on orientation in the harbor.

The arcuate path 301 is described as being compound because the pipeline L will be allowed or caused to bend in different planes. Looking at FIG. 17, the pipeline L approaches the jetty 311 at an angle of 90° or less and then turns toward the final approach 305 about a horizontal component of the radius 309, as on a vertically oriented cylinder. Looking at FIG. 18, the pipeline L sags from the jetty 311 about a vertical component of the radius 309, as on a horizontally oriented cylinder. The arcuate path 301 is a result of the combination of these horizontal and vertical components.

The pipeline L is propelled along the path 301 in any conventional manner for propelling pipelines, such as by use of a land-based prime mover 313 or by a cable pulled by the reeling drive (not shown) of the spool S. The final approach 305 leads the pipeline L to the lay tower 315 of the vessel V in substantially a straight line coming out of the compound radius 309. The path 301 is defined through the compound turn by sets of supporting rollers 317 and inside and outside guiding rollers 319 and 321, respectively, in relation to the radius 309.

The use of the compound elastic turn in the arcuate path 301 allows the pipeline reeling vessel V to be docked in a non-stern-on orientation in the harbor regardless of the angle at which the pipeline L approaches the edge of the jetty 311.

Delivering

Returning to FIG. 5, to deliver a preassembled pipeline L from its stored location 200 to a remote destination 300, a minimum bending radius of the pipeline L is selected and a fixed winding linear path 401 is defined which connects the storage location 200 to the destination 300. The defined path 401 has no turns of radius less than the determined minimum bending radius of the pipeline L. The pipeline L is caused to trace the fixed winding linear path 401 until the entire length of the pipeline L has travelled from the first location 200 to the second location 300. The selected minimum bending radius may be a plastic deformation radius of the pipeline L or an elastic bending radius of the pipeline L. Tracing may be caused by propelling the pipeline L to travel on supporting rollers 403 displaced in fixed positions along and rotating on axes 405 transverse to the defined path 401 and directing the travelling pipeline L to travel on the supporting rollers 403 with guiding rollers 407 and 411 displaced in fixed positions along and rotating on axes 409 and 413, respectively, transverse to the defined path 401 or by propelling the pipeline L to travel on supporting rollers displaced along, mounted to and rotating on axes transverse to the pipeline L and directing the travelling pipeline L with a guide preventing diversion of the supporting rollers from the defined path 401, as earlier discussed in relation to the storage path 203. In either case, propelling may be accomplished by pulling or pushing the pipeline L to trace the defined path 401. As also earlier discussed, and as shown on FIGS. 12-14, the guide may be a channel in which the supporting rollers travel or at least one rail on which the supporting rollers are engaged.

Figure 19:
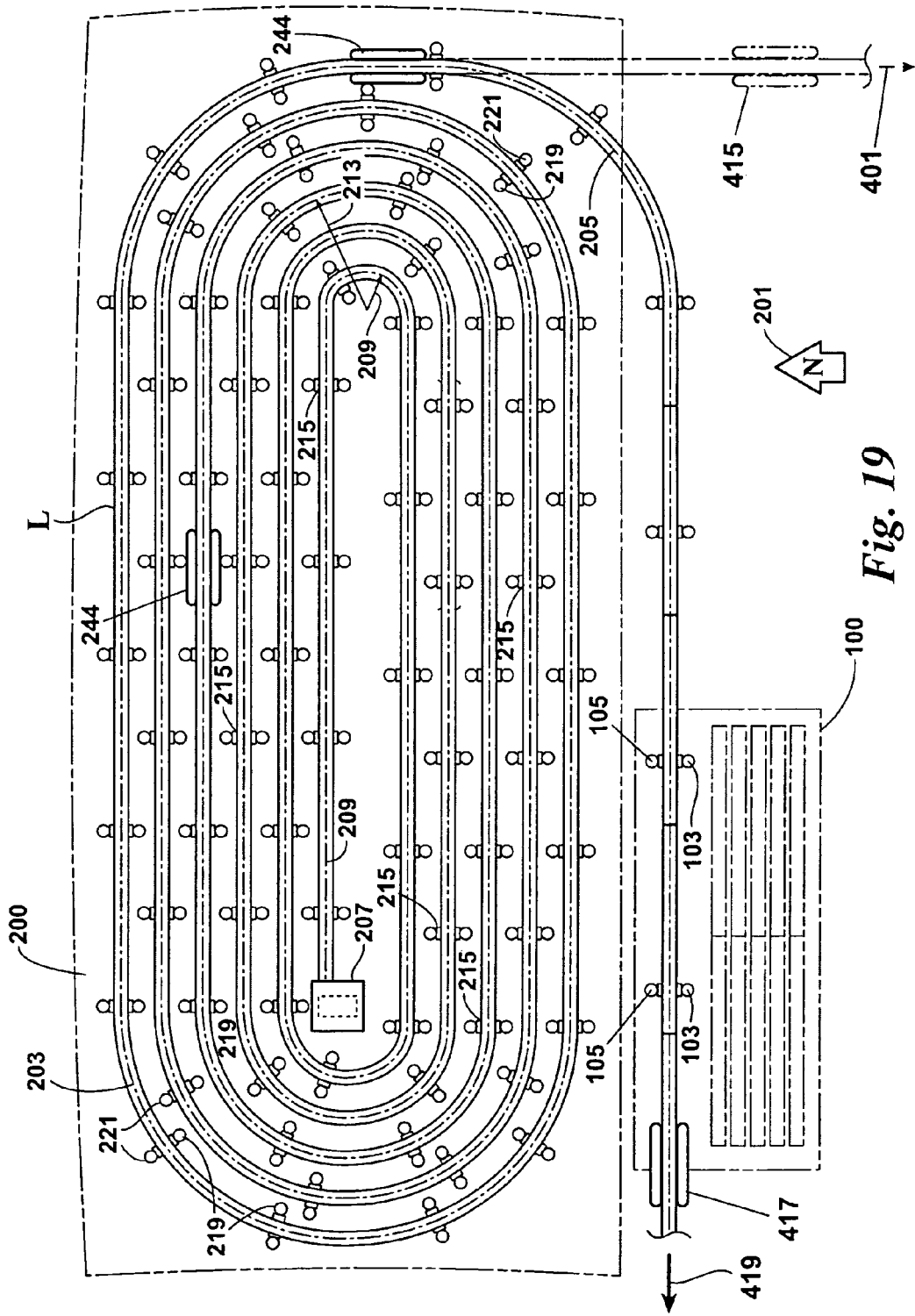
FIG. 19 is a plan view illustrating the retrieval of pipeline from a storage site.

Turning to FIG. 19, in retrieving pipeline L from the storage site 200 for transfer on the delivery path 401, the prime movers 244 used in storing the pipeline L, as seen in FIG. 6, can be used to push or pull the pipeline L from the storage path 203 onto the delivery path 401. Alternatively, the delivery path prime movers 415, as seen in FIG. 5, can be used to pull the pipeline L onto the delivery path 401. One or more other prime movers such as the prime mover 417 at the trailing end of the weld station 100 can be used to propel the pipeline L along other delivery paths 419. The pipeline L can be cut at any point along the storage path 203 and a connecting path installed extending from the cut to the delivery path 401 using the principles herein described so as to retrieve a portion of the pipeline L and leave the remaining portion in storage. In the same way, portions of the pipeline L can be separated from the pipeline L for transfer to repair locations or to other positions on the stored pipeline L. The pipeline L can be retrieved from the storage site 200 in any direction.

Figure 20:
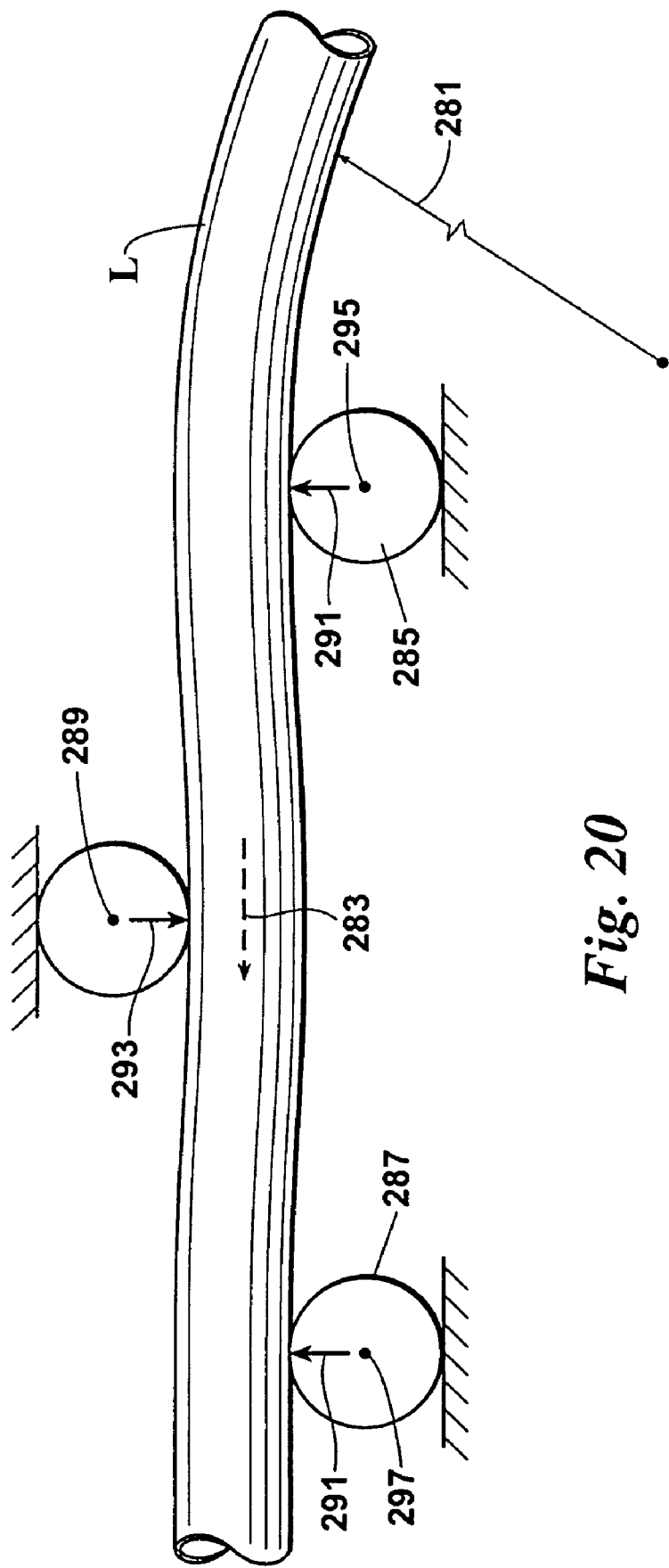
FIG. 20 is an enlarged plan view illustrating the straightening of plastically bent pipeline according to the present invention.

If the pipeline L is plastically bent at any point between the weld station 100 and the spool S, then, as seen in FIG. 20 as the pipeline L comes out of each plastic bend 281 in a downstream direction 283, sets of straightening rollers including spaced-apart radially inside rollers 285 and 287 rotating on axes 295 and 297, respectively, with an offset radially outside roller 289 rotating on an axis 299 in between, exert outward 291 and inward 293 counterbalancing forces to straighten the bent pipeline L.

Figure 21:
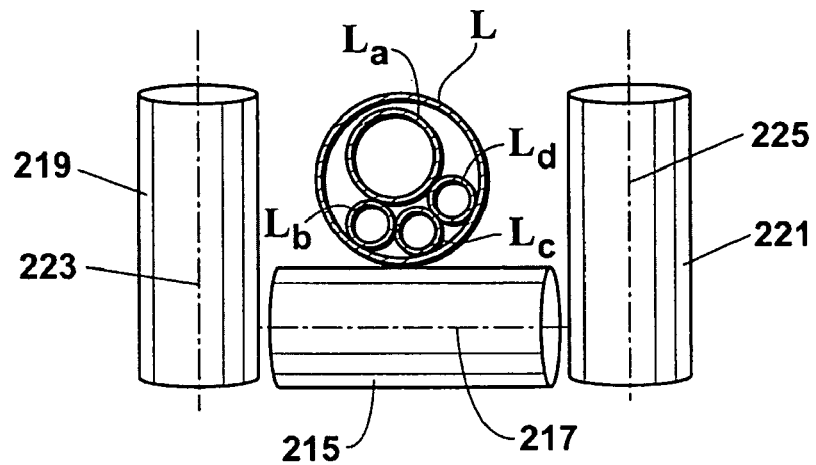
FIG. 21 is a cross-sectional view illustrating storage or delivery of bundled pipelines according to the present invention.
Figure 22:
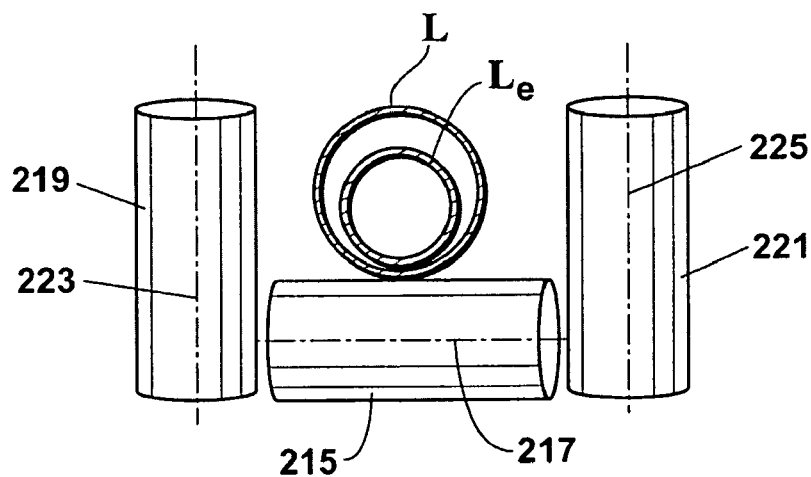
FIG. 22 is a cross-sectional view illustrating storage or delivery of pipeline-in-pipeline according to the present invention.
Figure 23:
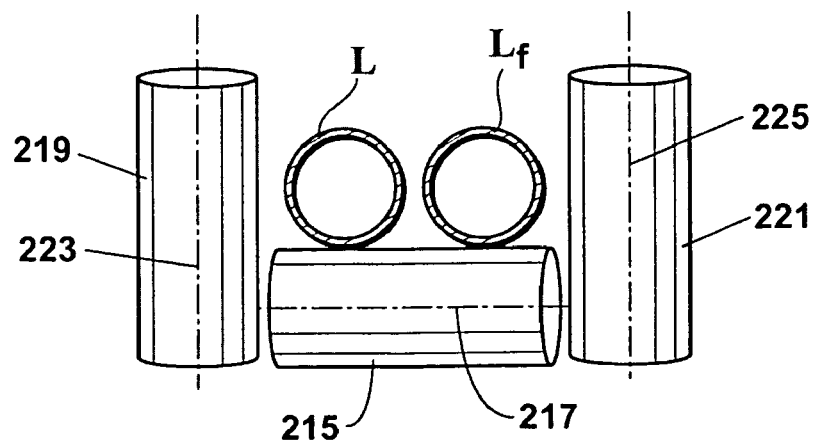
FIG. 23 is a cross-sectional view illustrating horizontal storage or delivery of multiple pipelines according to the present invention.

The method and system of this invention can reduce reeling time by as much as 60% or more and afford seasonal cost savings of as much as $20,000,000 per lay vessel. The system can, in comparison to known systems, be relatively easily constructed, deconstructed and transported from one site to another. As seen in FIGS. 21-23, the method and system can also be used with bundled pipelines $L_a$, $L_b$, $L_c$ and $L_d$, pipe-in-pipe pipelines $L_e$ and multiple side-by-side pipelines $L_f$ and $L_g$, greatly reducing the extensive linear site lengths presently required for such pipelines. And, as an added benefit, the method and system can help to mitigate the security risks associated with relatively larger or lengthier remote spool-based areas.

Thus, it is apparent that there has been provided, in accordance with the invention, a method and system for storing, delivering and spooling preassembled pipelines that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. For use in storing a pipeline above a selected geometric area, a method comprising the steps of:
   selecting a minimum bending radius of the pipeline;
   determining a maximum length for the pipeline;
   defining a fixed winding linear path within a vertical space above the selected geometric area, the path having no turns of radius less than the selected minimum bending radius of the pipeline and a length not less than the determined maximum length for the pipeline; and
   causing the pipeline to trace the fixed winding path until the entire pipeline is on the winding path.

2. A method according to claim 1, said step of selecting being characterized by the bending radius being a minimum plastic deformation radius of the pipeline.

3. A method according to claim 1, said step of selecting being characterized by the bending radius being a minimum elastic radius of the pipeline.

4. A method according to claim 1, said step of causing being characterized by propelling the pipeline to travel on supporting rollers displaced in fixed positions along and rotating on axes transverse to the defined path.

5. A method according to claim 4, said step of causing being further characterized by one of pulling and pushing the pipeline to trace the defined path.

6. A method according to claim 4, said step of causing being further characterized by directing the travelling pipeline to travel on the supporting rollers with guiding rollers displaced in fixed positions along and rotating on axes transverse to the defined path.

7. A method according to claim 1, said step of causing being characterized by propelling the pipeline to travel on supporting rollers displaced along, mounted to and rotating on axes transverse to the pipeline.

8. A method according to claim 7, said step of causing being further characterized by one of pulling and pushing the pipeline to trace the defined path.

9. A method according to claim 7, said step of causing being further characterized by directing the travelling pipeline with a guide preventing diversion of the supporting rollers from the defined path.

10. A method according to claim 9, said guide being one of:
    a channel in which the supporting rollers travel; and
    at least one rail on which the supporting rollers are engaged.

11. For use in reeling onto a spool a pipeline delivered on a path extending from a remote location to a point proximate the spool, a method comprising the steps of:
    selecting a minimum bending radius of the pipeline;
    defining a path from the proximate point to the spool, the path having a turn into substantially perpendicular relationship to a rotational axis of and for intersection with the spool, the turn having a radius not less than the selected minimum bending radius of the pipeline; and
    causing the pipeline to trace the path until the pipeline is reeled onto the spool with a trailing end of the pipeline having exited the path.

12. A method according to claim 11, said step of selecting being characterized by the bending radius being a minimum plastic deformation radius of the pipeline.

13. A method according to claim 11, said step of selecting begin characterized by the bending radius being a minimum elastic bending radius of the pipeline.

14. A method according to claim 11, said step of defining being characterized by the turn being compound with components not less than the selected minimum bending radius of the pipeline.

15. A method according to claim 11, said step of defining being characterized by inclusion of a final approach in the path to a ship-board spool, the final approach being substantially parallel to a keel of a ship aligned in a non-stern-on docking orientation.

16. A method according to claim 15, the pipeline tracing the defined path until a trailing end of the pipeline has travelled along and exited the final approach and crossed a stern of the ship.

17. For use in delivering a pipeline from a first location to a second location, a method comprising the steps of:
    selecting a minimum bending radius of the pipeline;
    defining a fixed winding linear path connecting the locations, a length of the path being not less than a length of the pipeline and the path having no turns of radius less than the selected minimum bending radius of the pipeline; and
    causing the pipeline to trace the fixed winding linear path until a leading end of the pipeline has travelled from the first location to the second location.

18. A method according to claim 17, said step of selecting being characterized by the bending radius being a minimum plastic deformation radius of the pipeline.

19. A method according to claim 17, said step of selecting being characterized by the bending radius being a minimum elastic radius of the pipeline.

20. A method according to claim 17, said step of causing being characterized by propelling the pipeline to travel on supporting rollers displaced in fixed positions along and rotating on axes transverse to the defined path.

21. A method according to claim 20, said step of causing being further characterized by directing the travelling pipeline to travel on the supporting rollers with guiding rollers displaced in fixed positions along and rotating on axes transverse to the defined path.

22. A method according to claim 17, said step of causing being characterized by propelling the pipeline to travel on supporting rollers displaced along, mounted to and rotating on axes transverse to the pipeline.

23. A method according to claim 17, said step of causing being further characterized by directing the travelling pipeline with a guide preventing diversion of the supporting rollers from the defined path.

24. A method according to claim 23, said guide being one of:
    a channel in which the supporting rollers travel; and
    at least one rail on which the supporting rollers are engaged.

25. A method according to claim 17, said step of causing being further characterized by one of pulling and pushing the pipeline to trace the defined path.

26. For use in storing a pipeline above a selected geometric area, a system comprising:
means for supporting and means for guiding the pipeline in a fixed, winding linear path within a vertical space above the selected geometric area, said path having a length not less than a length of the pipeline; and
means for propelling the pipeline to trace said path until the entire pipeline is on said path.

27. A system according to claim 26, said path having no turns of radius less than a minimum plastic deformation radius of the pipeline.

28. A system according to claim 26, said path having no turns of radius less than a minimum elastic radius of the pipeline.

29. A system according to claim 26, said means for supporting comprising rollers displaced in fixed positions along said path to provide vertical support for the pipeline, said vertical support rollers being journalled for rotation on axes transverse to said path in response to the pipeline traveling on said vertical support rollers.

30. A system according to claim 29, said means for guiding comprising rollers displaced in fixed positions along said path to provide lateral guidance for the pipeline, said lateral guidance rollers being journalled for rotation on axes transverse to said path in response to contact with the pipeline resulting from deviation of the pipeline from said path.

31. A system according to claim 26:
said means for guiding comprising a fixed guide member contoured to follow and extending for said length of said path; and
said means for supporting comprising rollers displaced along, mounted to and rotating on axes transverse to the pipeline, said rollers being cooperably engaged with said guide member for travel therealong.

32. A system according to claim 31, said fixed guide member comprising a channel in which the supporting rollers travel.

33. A system according to claim 31, said fixed guide member comprising
at least one rail on which the supporting rollers are engaged.

34. A system according to claim 26, said means for propelling comprising a winch and cable for pulling the pipeline to trace said path.

35. A system according to claim 26, said means for propelling comprising at least one tensioner engaged with the pipeline for one of pushing and pulling the pipeline to trace said path.

36. For use in realigning a pipeline traveling from a remote location along a delivery path to an initial approach point proximate a spool for reeling onto the spool, a system comprising means for supporting and guiding the pipeline along a realigning path from the initial approach point to a final approach point to the spool, the realigning path having a turn from the initial approach point into alignment at a final approach point in substantially perpendicular relationship to a rotational axis of and for intersection with the spool.

37. A system according to claim 36, said path having a single turn of constant radius.

38. A system according to claim 37, said radius being not less than a minimum plastic deformation radius of the pipeline.

39. A system according to claim 37, said radius being not less than a minimum elastic bending radius of the pipeline.

40. A system according to claim 37, said turn having a compound bending radius, said radius having components not less than a selected radius of the pipeline.

41. A system according to claim 36, said path having a final approach from said final approach point to a ship-board spool, said final approach being substantially parallel to a keel of the ship.

42. A system according to claim 41, said ship being aligned in a non-stern-on docking orientation.

43. For use in delivering a pipeline from a first location to a second location, a system comprising:
means for supporting and means for guiding the pipeline in a fixed winding linear path connecting the locations, a length of said path being not less than a length of the pipeline and said path having no turns of radius less than the determined minimum bending radius of the pipeline; and
means for propelling the pipeline to trace said fixed winding linear path until a leading end of the pipeline has travelled from the first location to the second location.

44. A system according to claim 43, said path having no turns of radius less than a minimum plastic deformation radius of the pipeline.

45. A system according to claim 43, said defined path having no turns of radius less than a minimum elastic radius of the pipeline.

46. A system according to claim 43, said means for supporting comprising rollers displaced in fixed positions along said path to provide vertical support for the pipeline, said vertical support rollers being journalled for rotation on axes transverse to said path in response to the pipeline traveling on said vertical support rollers.

47. A system according to claim 46, said means for guiding comprising rollers displaced in fixed positions along said path to provide lateral guidance for the pipeline, said lateral guidance rollers being journalled for rotation on axes transverse to said path in response to contact with the pipeline resulting from deviation of the pipeline from said path.

48. A system according to claim 43:
said means for guiding comprising a fixed guide member contoured to follow and extending for said length of said path; and
said means for supporting comprising rollers displaced along, mounted to and rotating on axes transverse to the pipeline, said rollers being cooperably engaged with said guide member for travel therealong.

49. A system according to claim 48, said fixed guide member comprising a channel in which the supporting rollers travel.

50. A system according to claim 48, said fixed guide member comprising
at least one rail on which the supporting rollers are engaged.

51. A system according to claim 43, said means for propelling comprising a winch and cable for pulling the pipeline to trace said path.

52. A system according to claim 43, said means for propelling comprising at least one tensioner engaged with the pipeline for one of pushing and pulling the pipeline to trace said path.

* * * * *